US011044367B2

(12) United States Patent
Soini et al.

(10) Patent No.: US 11,044,367 B2
(45) Date of Patent: Jun. 22, 2021

(54) SINGLE INTERFACE FOR PROVISIONING COLLECTED DATA TO REQUESTING SYSTEMS

(71) Applicant: T-Mobile USA, Inc., Bellevue, WA (US)

(72) Inventors: Jonathan Soini, Bellevue, WA (US); Timothy Shelton, North Bend, WA (US); Alex Thanh Nguyen, Bellevue, WA (US); Ganesh Balgum, Redmond, WA (US); Vikas Verma, Sammamish, WA (US); Tony Giannini, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/703,801

(22) Filed: Dec. 4, 2019

(65) Prior Publication Data
US 2020/0220979 A1 Jul. 9, 2020

Related U.S. Application Data

(63) Continuation of application No. 16/138,716, filed on Sep. 21, 2018, now Pat. No. 10,623,577, which is a continuation of application No. 15/474,909, filed on Mar. 30, 2017, now Pat. No. 10,084,922.

(60) Provisional application No. 62/316,443, filed on Mar. 31, 2016.

(51) Int. Cl.
H04M 7/00 (2006.01)
H04W 8/26 (2009.01)
H04W 8/18 (2009.01)
H04L 29/08 (2006.01)
H04L 29/06 (2006.01)
H04M 3/42 (2006.01)
H04W 12/02 (2009.01)
(Continued)

(52) U.S. Cl.
CPC ...... H04M 7/0012 (2013.01); H04L 63/0407 (2013.01); H04L 67/20 (2013.01); H04L 67/2833 (2013.01); H04M 3/4217 (2013.01); H04W 8/183 (2013.01); H04W 8/26 (2013.01); H04W 12/02 (2013.01); H04M 2207/18 (2013.01); H04W 12/71 (2021.01); H04W 12/72 (2021.01)

(58) Field of Classification Search
None
See application file for complete search history.

(56) References Cited

U.S. PATENT DOCUMENTS 10,084,922 B2    9/2018  Soini et al.
2012/0284775 A1* 11/2012  Betti ............... H04L 67/16
                                              726/3

(Continued)

Primary Examiner — Frantz Bataille
(74) Attorney, Agent, or Firm — Perkins Coie LLP

(57) ABSTRACT

Systems and methods are described herein for providing multiple, different types of information for mobile devices and associated users to requesting systems, such as customer service systems provided by telecommunications carriers. The systems and methods may generate a single API that, when called by a requesting system (e.g., via a request transmitted by the requesting system that includes subscriber or device information), provides data collected from multiple, disparate data sources back to the requesting system via the single API.

20 Claims, 12 Drawing Sheets

(51) Int. Cl.
*H04W 12/71* (2021.01)
*H04W 12/72* (2021.01)

(56) References Cited

U.S. PATENT DOCUMENTS

| | | | |
|---|---|---|---|
| 2015/0142677 A1* | 5/2015 | Patman | G06Q 30/016 |
| | | | 705/304 |
| 2016/0014084 A1* | 1/2016 | Hansen | H04L 63/1441 |
| | | | 726/11 |
| 2017/0094021 A1 | 3/2017 | Brech et al. | |
| 2017/0215078 A1* | 7/2017 | Mochizuki | H04W 4/90 |
| 2019/0028593 A1 | 1/2019 | Sahli et al. | |

* cited by examiner

SINGLE INTERFACE FOR PROVISIONING COLLECTED DATA TO REQUESTING SYSTEMS

CROSS-REFERENCES TO RELATED APPLICATIONS

This application is a continuation of U.S. patent application Ser. No. 16/138,716 filed Sep. 21, 2018 and entitled "SINGLE INTERFACE FOR PROVISIONING COLLECTED DATA TO REQUESTING SYSTEMS"; which is a continuation of U.S. patent application Ser. No. 15/474,909 filed Mar. 30, 2017 and entitled "SINGLE INTERFACE FOR PROVISIONING COLLECTED DATA TO REQUESTING SYSTEMS", now U.S. Pat. No. 10,084,922; which claims the benefit of U.S. Provisional Patent Application Ser. No. 62/316,443, filed on Mar. 31, 2016, and entitled "SINGLE INTERFACE FOR PROVISIONING COLLECTED DATA TO REQUESTING SYSTEMS," the disclosure of which is hereby incorporated herein in its entirety by reference.

BACKGROUND

Typically, when a user of a mobile device is having problems with the operation or functionality of their device (or simply has questions about their device), they will contact a telecommunication carrier providing a telecommunications network for the device, or visit a retail store associated with the carrier, in order to seek assistance in resolving the problems.

The carrier may obtain information from the user and/or the mobile device, in order to gain and understanding or context about the type, functionality, or historical use of the device. Often, however, the carrier, via various internal or backend systems, may obtain imperfect or non-useful information. Without useful or helpful information providing context for the user's problems with the device, the carrier may have issues troubleshooting the problems and eventually finding a resolution.

BRIEF DESCRIPTION OF THE DRAWINGS

Embodiments of the disclosed technology will be described and explained through the use of the accompanying drawings.

Figure 1:
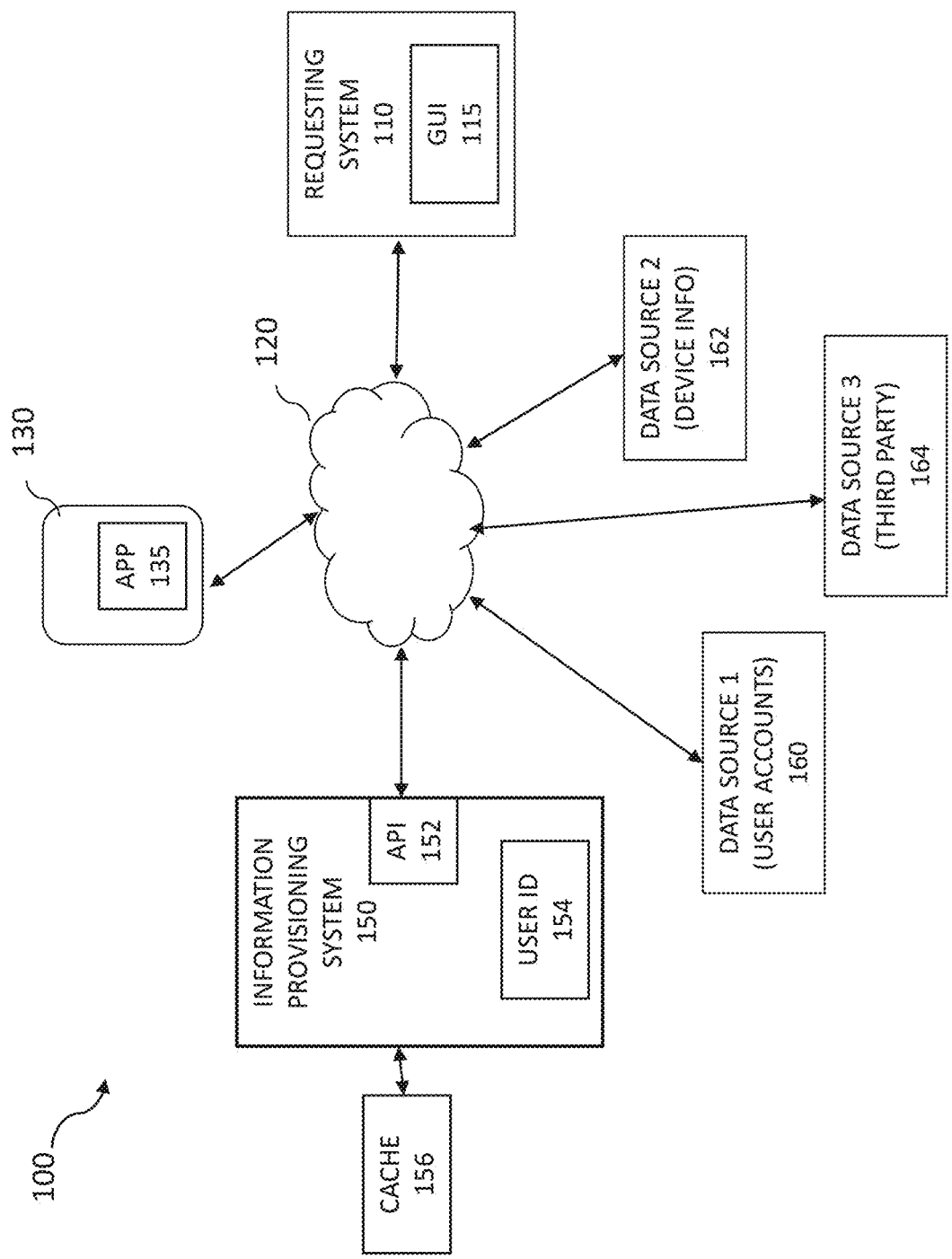
FIG. 1 is a block diagram illustrating a suitable computing environment within which to provide a single interface for provisioning data to requesting systems.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for providing multiple, different types of information for mobile devices and associated users to requesting systems, such as customer service systems provided by telecommunications carriers. The systems and methods may generate a single API that, when called by a requesting system (e.g., via a request transmitted by the requesting system that includes subscriber or device information), provides data collected from multiple, disparate data sources back to the requesting system via the single API.

For example, the systems and methods may publish a single application programming interface (API) at which calls for data are received from requesting systems associated with a wireless network carrier, receive, via the single API, a data request from a requesting system that includes information identifying a mobile device or subscriber of the wireless network carrier that is associated with the mobile device, collect data in response to the data request from multiple, disparate sources of data, and provide the data collected from the multiple, disparate sources of data to the requesting system via the single API.

In some cases, the request includes a short alphanumeric code that represents the mobile device and obscures an identity of the subscriber associated with the mobile device.

The systems and methods, therefore, provide, via the single, uniform API, a layer of abstraction between the requesting system and the various different data sources, enabling the requesting system to simply provide subscriber or device identity information in order to obtain many different types of information from a multitude of different sources internal or external to wireless network carrier.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment 100 within which to provide a single interface for provisioning data to requesting systems 110. Requesting systems 110 may include customer service systems, such as internal systems that manage information and troubleshoot issues associated with mobile devices and subscribers of telecommunication networks, automated diagnostic systems that attempt to diagnose and resolve issues associated with mobile devices and their subscribers, and so on.

The requesting systems may present, render, or display received data or information via various graphical user interfaces (GUIs) 115, such as GUIs directed to customer service representatives, GUIs directed to field or device technicians, GUIs directed to customers or subscribers, and so on.

As described herein, the requesting system 110 often requests information associated with a mobile device 130, such as a smart phone, tablet computer, and so on. For example, a user of the mobile device 130 may bring the device into a retail store associated with a wireless network carrier and/or may contact the carrier via phone or messaging communications, in order to identify or resolve issues associated with the mobile device 130, the communications network provided by the network carrier, the user's account, and so on.

The requesting system 110 transmits a request for various types of information over a network 120 to the information from various data sources, such as a data source 160 associated with user account information, a data source 162 associated with device information, a data source 164 associated with information from a third party external to the wireless network carrier, and so on.

However, an information provisioning system 150 associated with and provided by the wireless network carrier receives the request from the requesting system 110. As described herein, the information provisioning system 150 may receive the request via a single application programming interface (API) 152, effectively providing a layer of abstraction between requesting system and the various, disparate data sources 160, 162, 164.

Further, the information provisioning system 150 may store collected data, such as data collected from the third party data source 164, in a cache 156 or other database. For example, the information provisioning system 150 may temporarily store data obtained from the third party data source 164 in the cache 156, in order to reduce the number of times the third party data source 164 is contacted or otherwise receives requests for data from the information provisioning system 150.

In response to the request, the information provisioning system 150 collects data from the various data sources 160, 162, 164, and provides the collected data, via the single API, to the requesting system 110. The requesting system 110 may then render, present, or otherwise display the collected data via the GUI 115. Further details regarding the processes and methods performed by the information provisioning system 150 are described herein.

In some embodiments, the mobile device 130 may include an application, script, or other functional component that is configured to generate short or quick alphanumeric codes (sometimes temporary) that represent and obscure the identity of a user associated with a mobile device. The inventory provisioning system 150 may receive the generated codes (e.g., via an unstructured supplementary service data (USSD) channel established between the device 130 and the system 150) and, via a user identification database 154, extract the identity of the user or mobile device represented by the codes.

FIG. 1 and the discussion herein provide a brief, general description of a suitable computing environment 100 in which the inventory provisioning system 150 can be supported and implemented. Although not required, aspects of the inventory provisioning system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2:
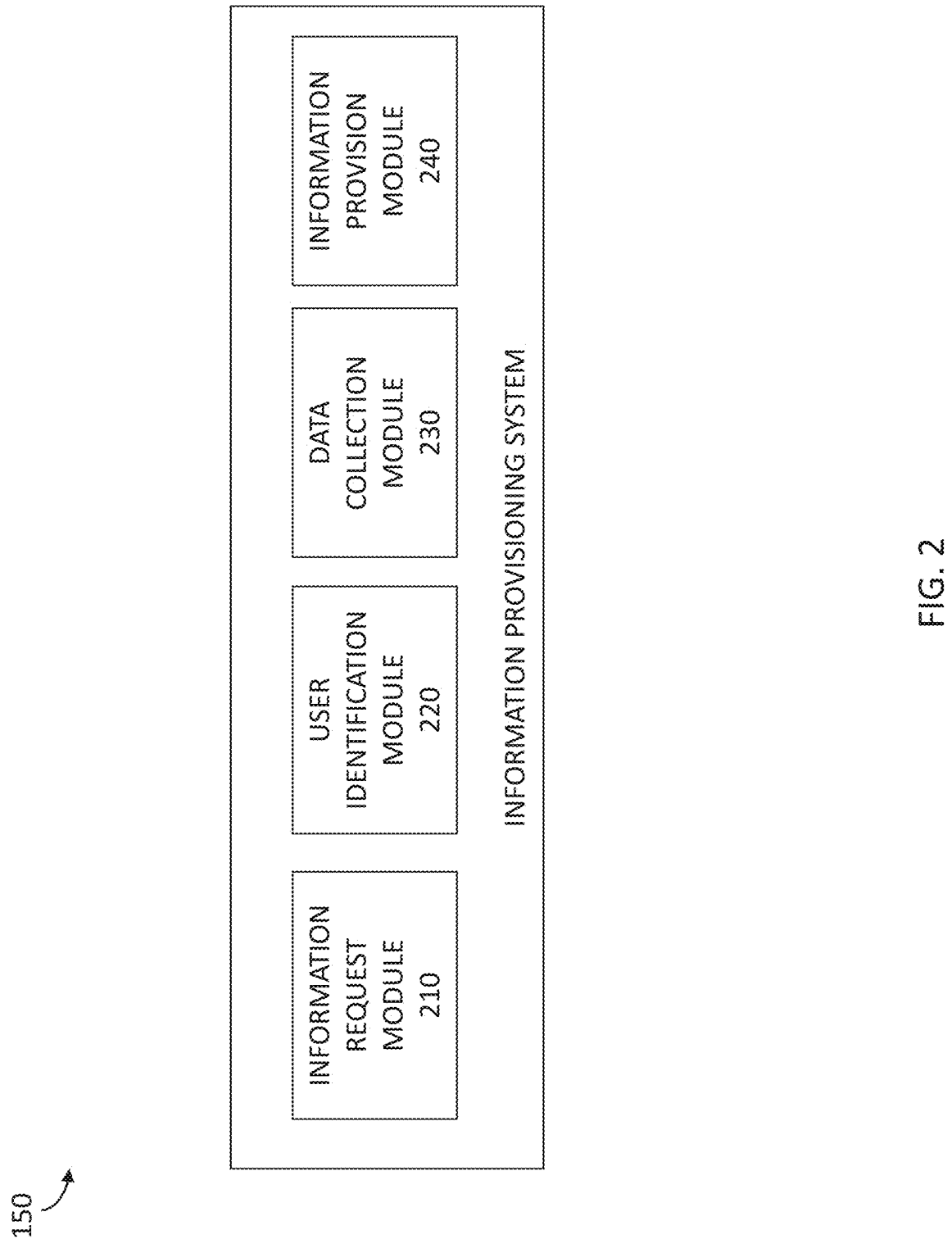
FIG. 2 is a block diagram illustrating the components of an information provisioning system.

In some embodiments, the mobile device 130, the requesting system 110, and/or the information provisioning system 150 may include network communication components that enable the devices to communicate with remote servers or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network Examples of Providing Data Collected from Multiple, Disparate Data Sources As described herein, in some embodiments, the systems and methods provide a layer of abstraction between systems requesting data for mobile devices and associated users and various different data sources that each contain and provide a portion of the requested data. FIG. 2 is a block diagram illustrating the components of the information provisioning system 150.

The information provisioning system 150 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, information provisioning system 150 may include an information request module 210, a user identification module 220, a data collection module 230, and an information provision module 240.

In some embodiments, the information request module 210 is configured and/or programmed to receive a request from a requesting system to provide multiple, disparate types of information associated with a mobile device to the requesting system via a single application programming interface (API) that receives calls from requesting systems for the multiple, disparate types of information.

For example, the request may include an international mobile station equipment identity (IMEI) that identifies the mobile device, a mobile station international subscriber directory number (MSISDN) associated with the user of the mobile device, and/or a short, alphanumeric code (e.g., a three digit code such as "6T5") that represents the mobile device and obscures an identity of a user associated with the mobile device. In some cases, the short code is a temporary code that is valid for a certain period of time (e.g., two or three hours), or until a troubleshooting session or other customer service session associated with the mobile device has been resolved or otherwise concluded.

In some embodiments, such as when the request includes the short, alphanumeric code, the user identification module 220 is configured and/or programmed to extract an identity of the mobile device from the code within the request that represents the mobile device and obscures the identity of the user associated with the mobile device. For example, the user identification module 220 may obtain the identity from user identification database 154, which may include entries relating the generated codes to user or device identity information.

In some embodiments, the data collection module 230 is configured and/or programmed to collect data associated with the extracted identity of the mobile device by accessing multiple, disparate, sources of data in order to obtain the requested multiple, disparate types of information. For example, the data collection module 230 collects data associated with characteristics of the mobile device, data associated with a wireless network provided by the telecommunications carrier to the mobile device, and data associated with a customer account for the user of the mobile device.

The data sources, such as data sources 160, 162, 164, may include one or more internal sources of data provided by the telecommunications or network carrier and/or one or more external sources of data provided by third parties unassociated with the telecommunications or network carrier. For example, the data sources 160, 162, 164 may include network subscriber databases (HLR/HSS) of the telecommunications carrier, various diagnostics databases, device databases associated with manufacturers of mobile devices, and so on. Therefore, the data collection module 230 may collect various types of data, including data associated with facts for a mobile device, data associated with features of the mobile device, and data associated with capabilities of the mobile device.

In some cases, the data collection module 230 collects first data from a first source of data, and collects second data from a second source of data that provides context information for the first data. For example, the data collection module 230 may first obtain data identifying the operating system of the mobile device, and then obtain data identifying capabilities of the operating system.

Thus, the information request module 210, upon receiving the request via the single API, identifies certain data sources of the multiple, disparate, sources of data from which to obtain the requested information, and instructs the data collection module 230 to obtain the requested information from the identified data sources.

In some embodiments, the information provision module 240 is configured and/or programmed to provide the collected data associated with the mobile device to the requesting system via the single API. For example, the information provision module 240 may provide one or more JavaScript Object Notation (JSON) files of collected data.

The collected data may include information associated with characteristics or facts of the mobile device (e.g., model, version of firmware, and so on), data associated with a wireless network provided by the telecommunications carrier to the mobile device, data associated with a customer account for the user of the mobile device, other features of the mobile device (e.g., type of version of operating system), other capabilities of the mobile device (e.g., account functions, and so on), and so on.

As a first example, the information provision module 240 may provide, via the single API, a file (e.g., a JSON file) containing facts type information collected from different data sources, as follows:

```
{
    "facts": {
        "odd.device.software.screentimeout": {
            "timestamp": "2016-03-21T11:19:44-04:00",
            "source": "d3",
            "value": 600
        },
        "odd.makemodel": {
            "timestamp": "2016-03-21T11:19:44-04:00",
            "source": "d3",
            "value": "zee"
        },
        "odd.device.software.lastreboot": {
            "timestamp": "2016-03-21T11:19:44-04:00",
            "source": "d3",
            "value": "2016-03-22T15:21:31-04:00"
        },
        "odd.device.data.roaming": {
            "timestamp": "2016-03-21T11:19:44-04:00",
            "source": "d3",
```

```
        "value": false
    },
    "odd.device.software.apps": {
        "timestamp": "2016-03-21T11:19:44-04:00",
        "source": "d3",
        "value": 250
    },
    "odd.device.software.mode.car": {
        "timestamp": "2016-03-21T11:19:44-04:00",
        "source": "d3",
        "value": false
    },
    "odd.device.storage.internal.free": {
        "timestamp": "2016-03-21T11:19:44-04:00",
        "source": "d3",
        "value": 18320408576
    },
    "odd.device.data.mobile": {
        "timestamp": "2016-03-21T11:19:44-04:00",
        "source": "d3",
        "value": true
    },
    "device.firmwareVersion": {
        "timestamp": "2016-03-21T11:19:44-04:00",
        "source": "d3",
        "value": "KOT49I.D95920h"
    },
    "odd.device.software.mode.developer": {
        "timestamp": "2016-03-21T11:19:44-04:00",
        "source": "d3",
        "value": true
    },
    "odd.device.wfc": {
        "timestamp": "2016-03-21T11:19:44-04:00",
        "source": "d3",
        "value": "off"
    },
    "odd.device.software.mode.talkback": {
        "timestamp": "2016-03-21T11:19:44-04:00",
        "source": "d3",
        "value": false
    },
    "odd.device.defaultapn": {
        "timestamp": "2016-03-21T11:19:44-04:00",
        "source": "d3",
        "value": "fast.t-mobile.com"
    },
    "odd.device.model": {
        "timestamp": "2016-03-22T15:22:51-04:00",
        "source": "memcache",
        "value": "H901"
    },
    "odd.device.wifi.enabled": {
        "timestamp": "2016-03-21T11:19:44-04:00",
        "source": "d3",
        "value": false
    },
    "odd.device.software.mode.airplane": {
        "timestamp": "2016-03-21T11:19:44-04:00",
        "source": "d3",
        "value": false
    },
    "odd.device.data.network": {
        "timestamp": "2016-03-21T11:19:44-04:00",
        "source": "d3",
        "value": "TYPE_WIFI"
    },
    "odd.device.make": {
        "timestamp": "2016-03-22T15:22:51-04:00",
        "source": "memcache",
        "value": "LG"
    },
    "odd.device.storage.internal.total": {
        "timestamp": "2016-03-21T11:19:44-04:00",
        "source": "d3",
        "value": 25896771584
    },
    "device.myaccountversion": {
        "timestamp": "2016-03-21T11:19:44-04:00",
        "source": "d3",
        "value": "5.1.4.1"
    },
    "device.osversion": {
        "timestamp": "2016-03-21T11:19:44-04:00",
        "source": "d3",
        "value": "4.4.2"
    },
    "odd.device.data.bluetooth.enabled": {
        "timestamp": "2016-03-21T11:19:44-04:00",
        "source": "d3",
        "value": false
    },
    "odd.device.software.rooted": {
        "timestamp": "2016-03-21T11:19:44-04:00",
        "source": "d3",
        "value": false
    }
},
```

As a second example, the information provision module 240 may provide, via the single API, a file containing features type information collected from different data sources, as follows:

```
"features": {
    "os": {
        "osVersion": "Android 4.3",
        "osName": "Android"
    },
    "hardware": {
        "cpu": "Krait, 2.3GHz, Quad core",
        "screenRes": "1280x720"
    },
    "tac": "01392500",
    "general": {
        "carrier": "T-Mobile"
    },
    "network": {
        "wifi": "802.11 a/b/g/n/ac",
        "3gBands": [
            "Band I (UMTS 2100)",
            "Band II (1900)",
            "Band IV (1700/2100/AWS)",
            "Band V (850)"
        ],
        "gsmBands": [
            "850 MHz,900 MHz, 1800 MHz, 1900 MHz"
        ],
        "lteBands": [
            "Band 2 (PCS 1900 MHz)",
            "Band 4 (AWS 1700 MHz)",
            "Band 17 (L-SMH-BC 700 MHz)"
        ],
        "wifiCalling": false,
        "nfc": true,
        "lte": true
    }
},
```

As described herein, the requesting system 110, via the GUI 115, may render, present, or otherwise display the collected data (e.g., data provided by the information provision module 240), via user interfaces, as shown in FIGS. 3A-3G, to assist in troubleshooting issues associated with the mobile device, provide information to subscribers, and so on. In general, the user interfaces of FIGS. 3A-3G are self-explanatory, but a short description of each will nevertheless now be provided.

Figure 3A:
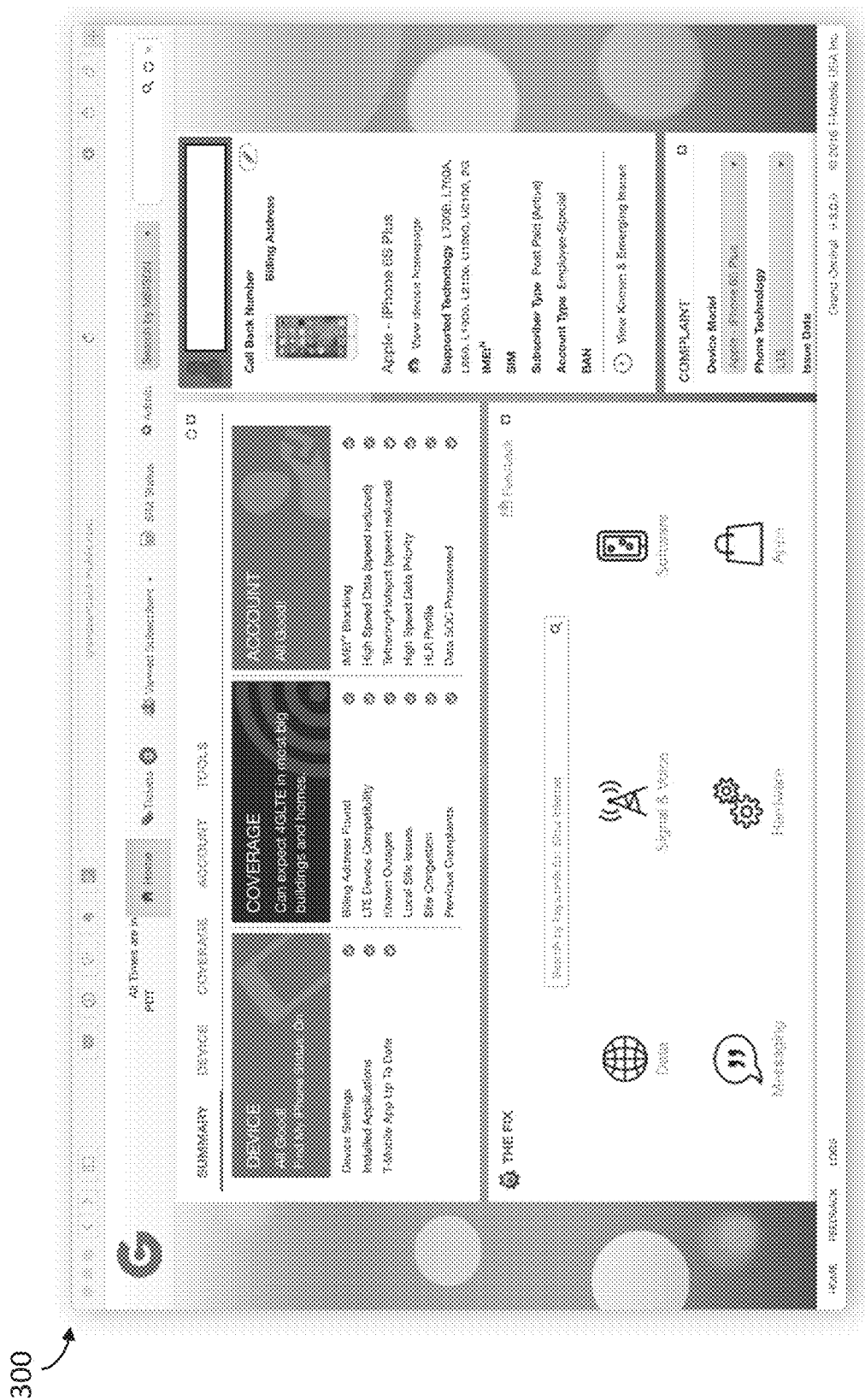
FIGS. 3A-3G are display diagrams illustrating example user interfaces presenting information obtained via a single application programming interface (API).

FIG. 3A is a display diagram illustrating a user interface 300 that presents an overall summary page of the different types of data collected by the system 150, such as device information, coverage or network information, user account information, and so on.

Figure 3B:
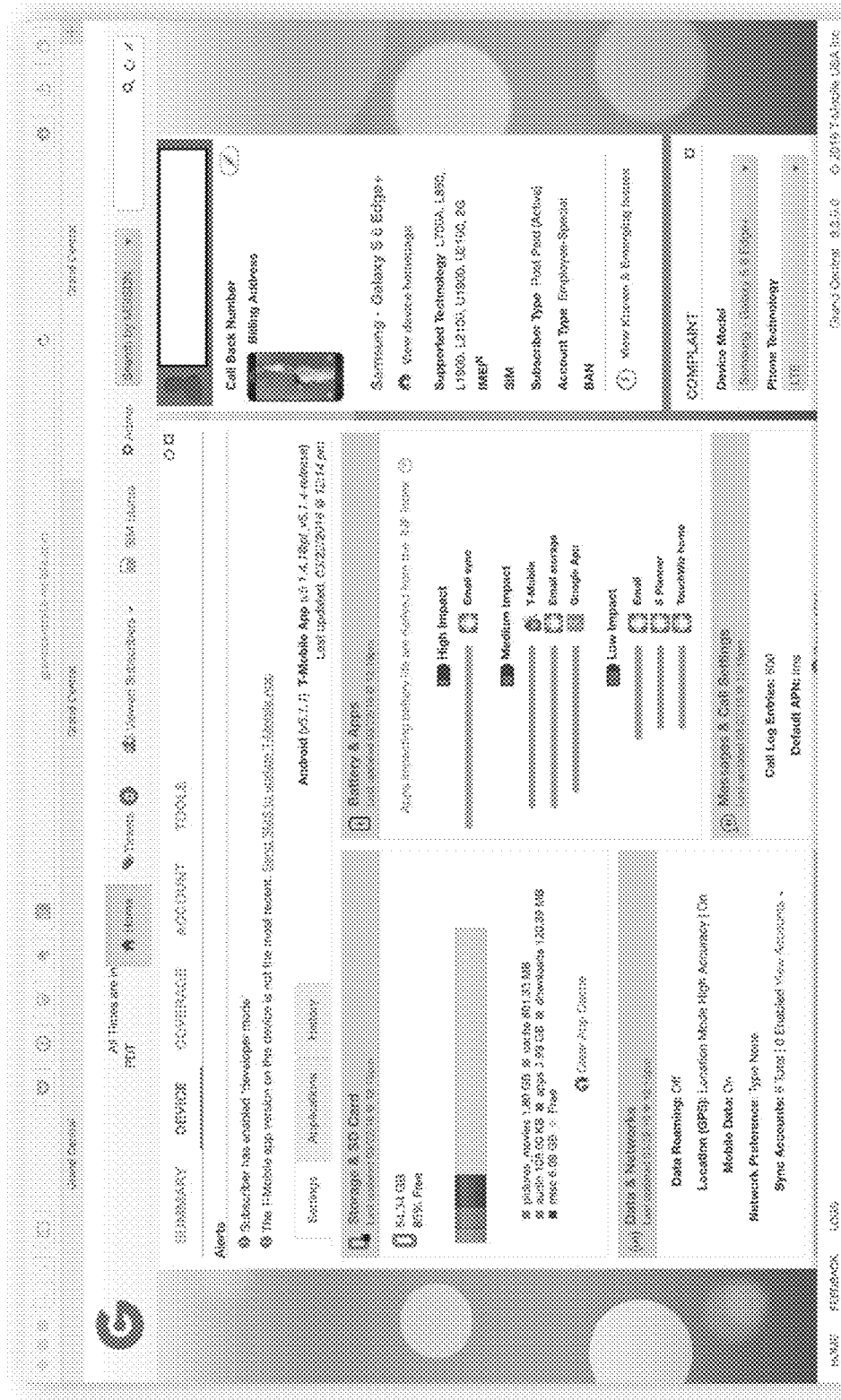
Figure 3C:
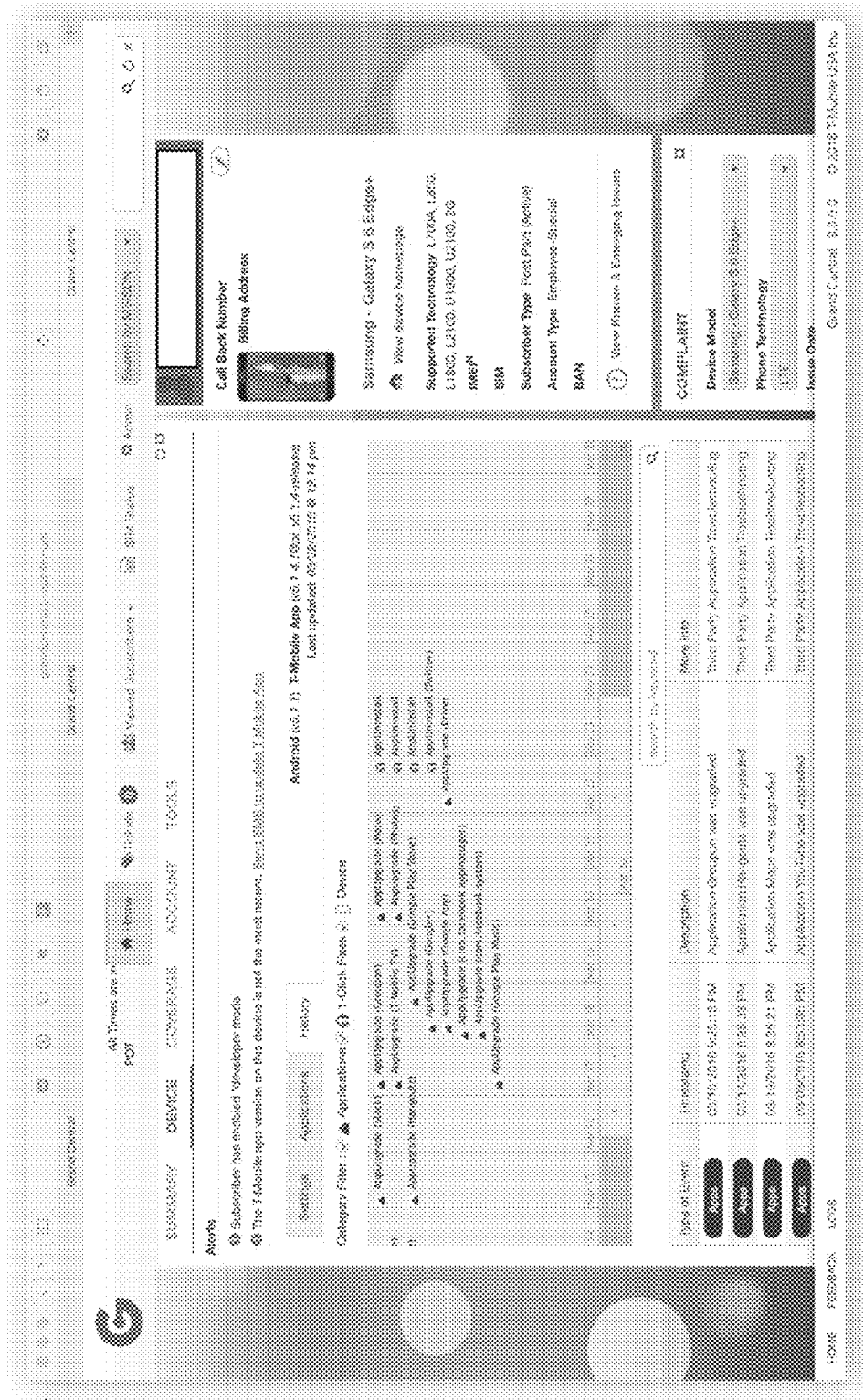

FIG. 3B is a display diagram illustrating a user interface 310 that presents device specific information, such as various facts associated with the device (e.g. the level of used storage, the impact level of applications on the battery of the device, and so on). FIG. 3C a display diagram illustrating a user interface 320 that presents additional device specific information, such as information identifying the applications downloaded to the device, when applications were upgraded, and so on.

Figure 3D:
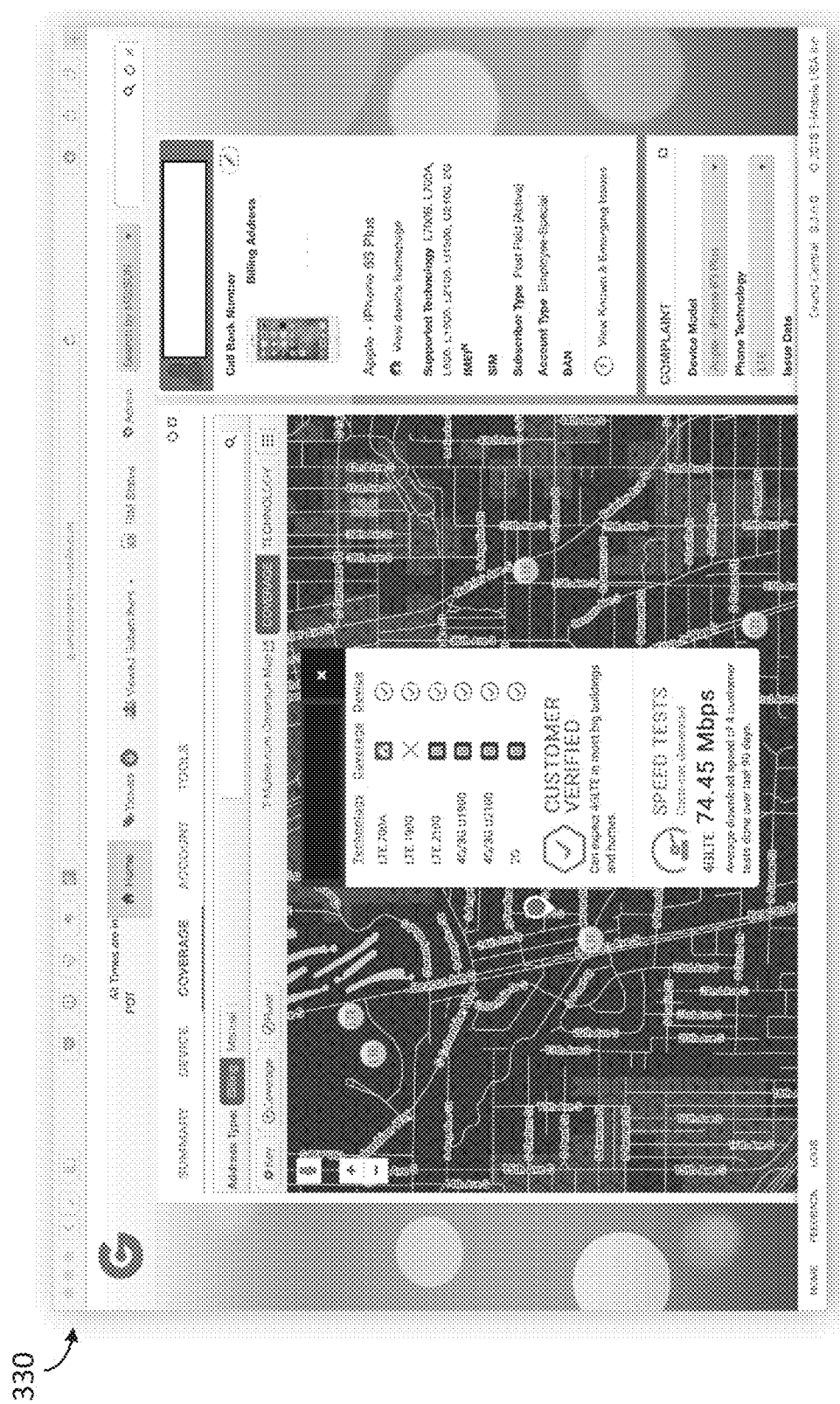

FIG. 3D is a display diagram illustrating a user interface 330 that presents coverage or network information for the network within which the mobile device operates. For example the user interface 330 displays verified coverage information, speed test information, and so on.

Figure 3E:
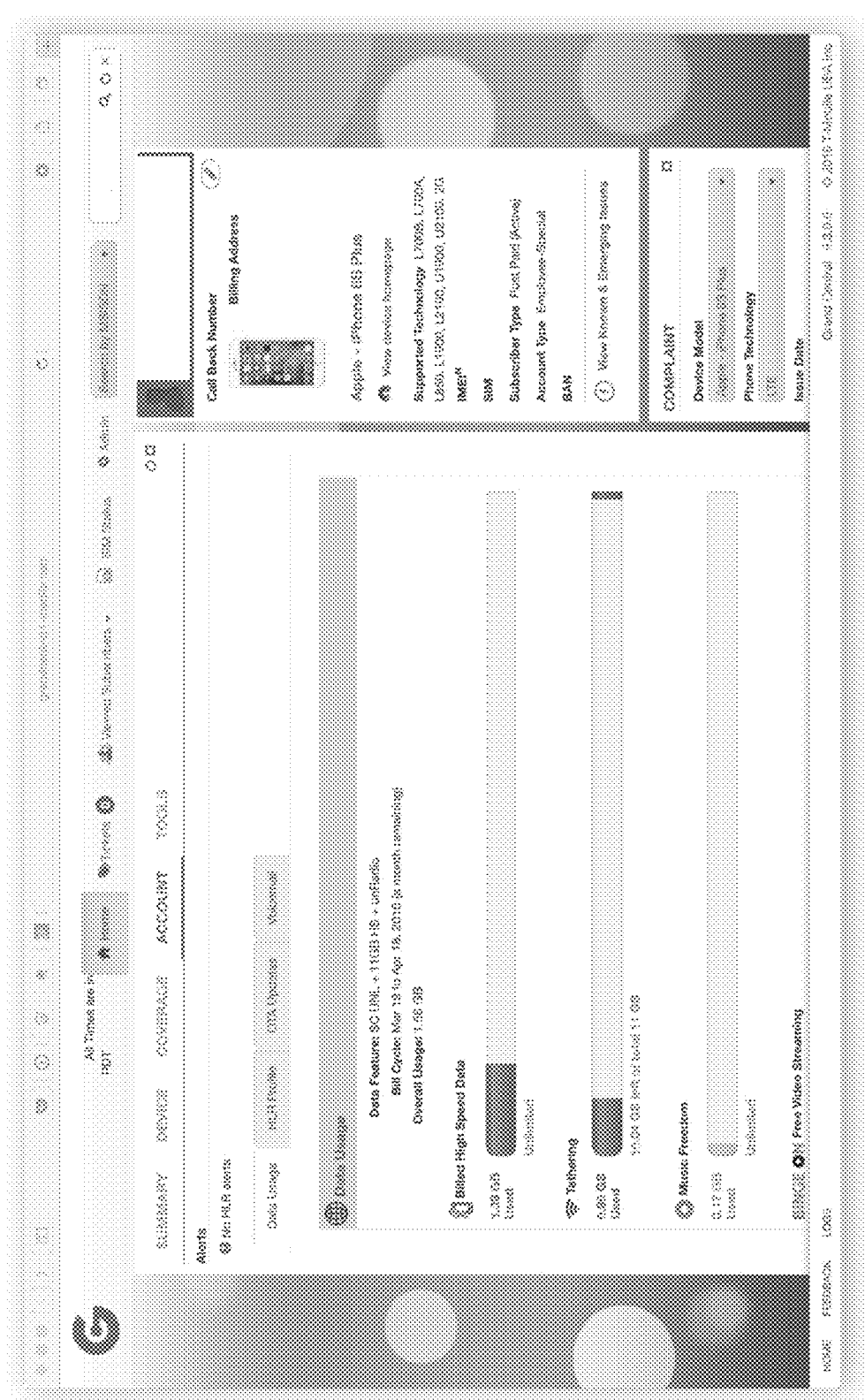

FIG. 3E is a display diagram illustrating a user interface 340 that presents account information associated with the user of the mobile device, such as user information, the amount of used data for a given time period, the amount of available data, the types of used data, and so on.

Figure 3F:
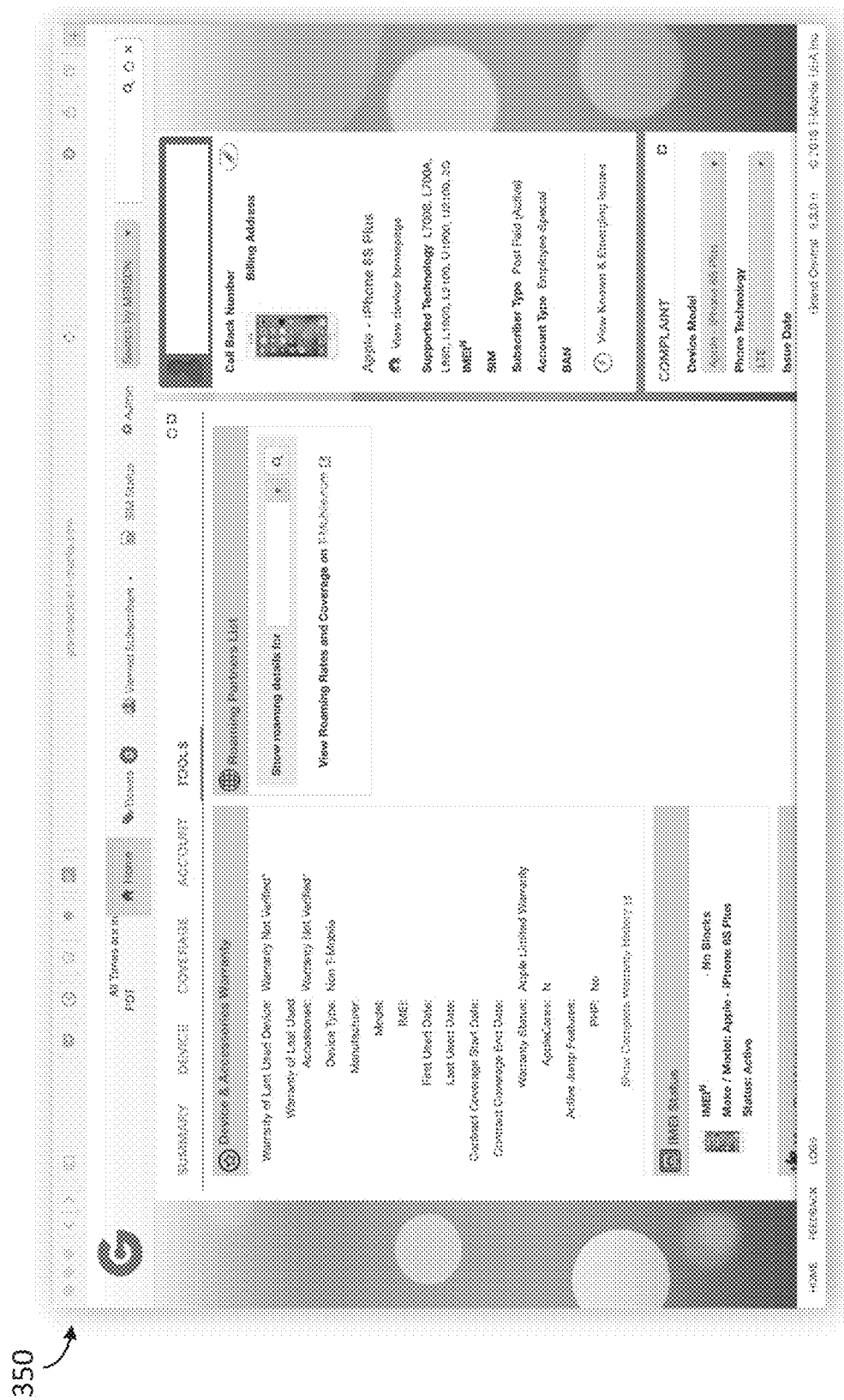

FIG. 3F is a display diagram illustrating a user interface 350 that presents information derived from various diagnostic tools, such as warranty information, device status information, and so on.

Figure 3G:
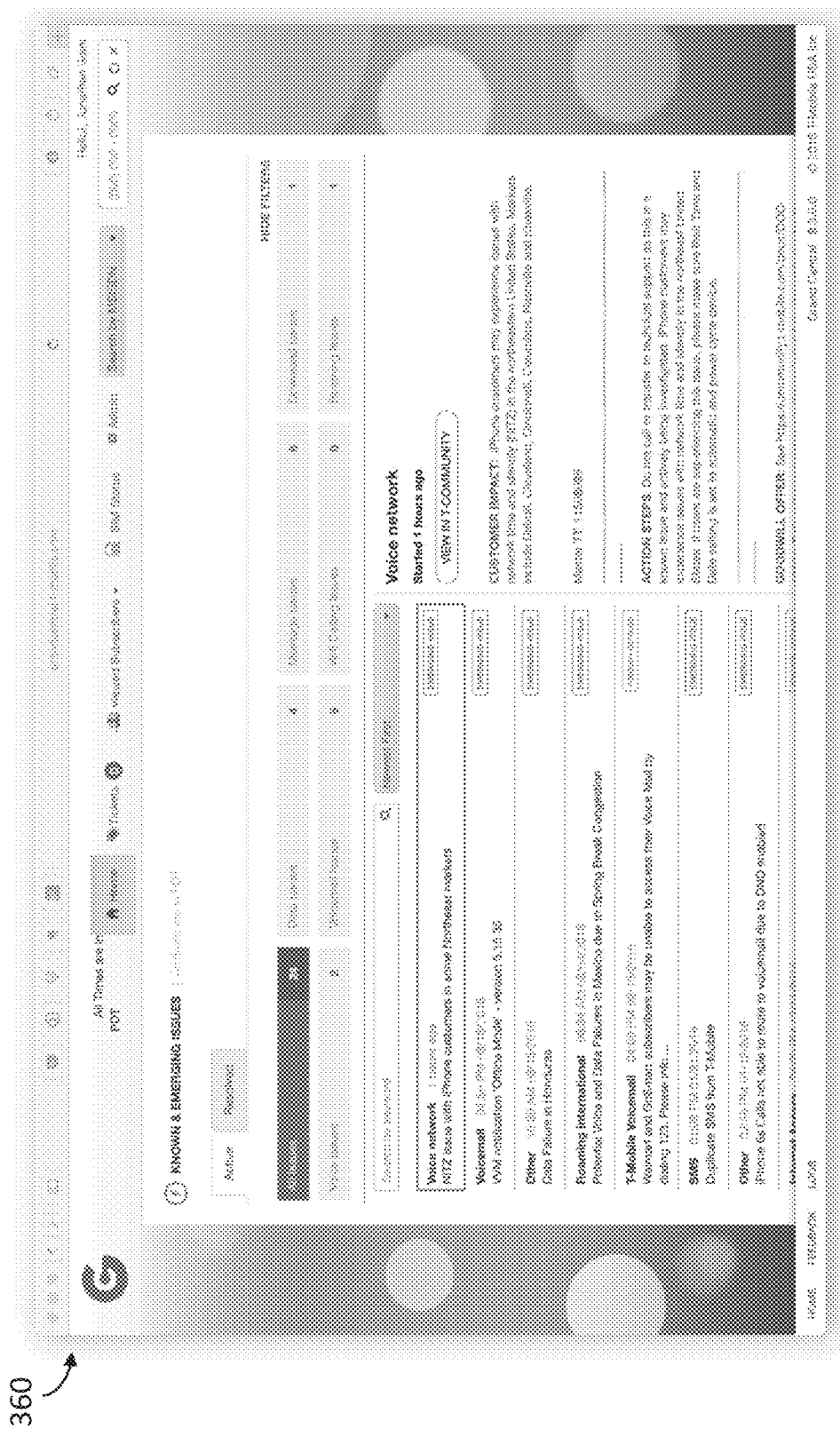

FIG. 3G is a display diagram illustrating a user interface 360 that presents information associated with known issues across the network (e.g., reported or diagnosed with respect to other mobile devices or users).

Of course, the requesting system 110 may present other types of information via the GUI 115 that is collected by the information provisioning system 150 and provided to the requesting system 110 via the single API 152.

Figure 4:
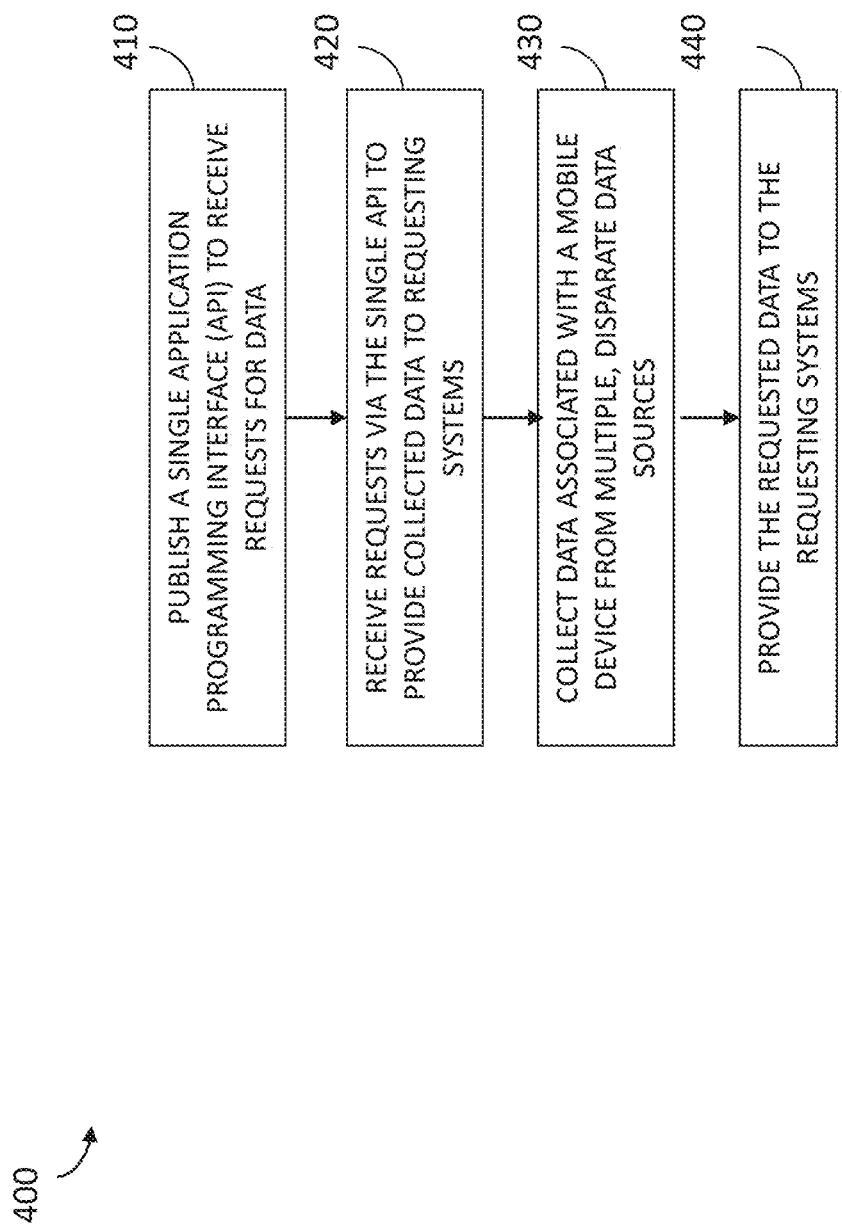
FIG. 4 is a flow diagram illustrating a method for providing data collected from multiple sources to a requesting system.

As described herein, the information provisioning system 150 performs various processes or operations in order to collect and provide different types of data associated with a mobile device to the requesting system 110. FIG. 4 is a flow diagram illustrating a method 400 for providing data collected from multiple sources to the requesting system 110. The method 400 may be performed by the information provisioning system 150 and, accordingly, is described herein merely by way of reference thereto. It will be appreciated that the method 400 may be performed on any suitable hardware.

In operation 410, the information provisioning system 150 publishes a single application programming interface (API) at which calls for data are received from requesting systems associated with a wireless network carrier.

In operation 420, the information provisioning system 150 receives, via the single API, a data request from the requesting system 110 that includes information identifying a mobile device or subscriber of the wireless network carrier that is associated with the mobile device. For example, the request may include an international mobile station equipment identity (IMEI) that identifies the mobile device, a mobile station international subscriber directory number (MSISDN) associated with the user of the mobile device, and/or a short, alphanumeric code (e.g., a three digit code such as "6T5") that represents the mobile device and obscures an identity of a user associated with the mobile device. In some cases, the short code is a temporary code that is valid for a certain period of time (e.g., two or three hours), or until a troubleshooting session or other customer service session associated with the mobile device has been resolved or otherwise concluded.

In operation 430, the information provisioning system 150 collects data in response to the data request from multiple, disparate sources of data. For example, the data collection module 230 collects data associated with characteristics of the mobile device, data associated with a wireless network provided by the telecommunications carrier to the mobile device, and data associated with a customer account for the user of the mobile device.

In operation 440, the information provisioning system 150 provides the data collected from the multiple, disparate sources of data to the requesting system 110 via the single API. For example, the information provision module 240 may provide, via the single API, one or more JavaScript Object Notation (JSON) files of collected data to the requesting system 110.

As described herein, in some embodiments, a request for data may include a code that represents, but obfuscates, the identity of a mobile device or subscriber, which allows subscribers to resolve issues with their devices without providing private or personal information as identifiers (e.g., telephone numbers, addresses, and so on).

Figure 5:
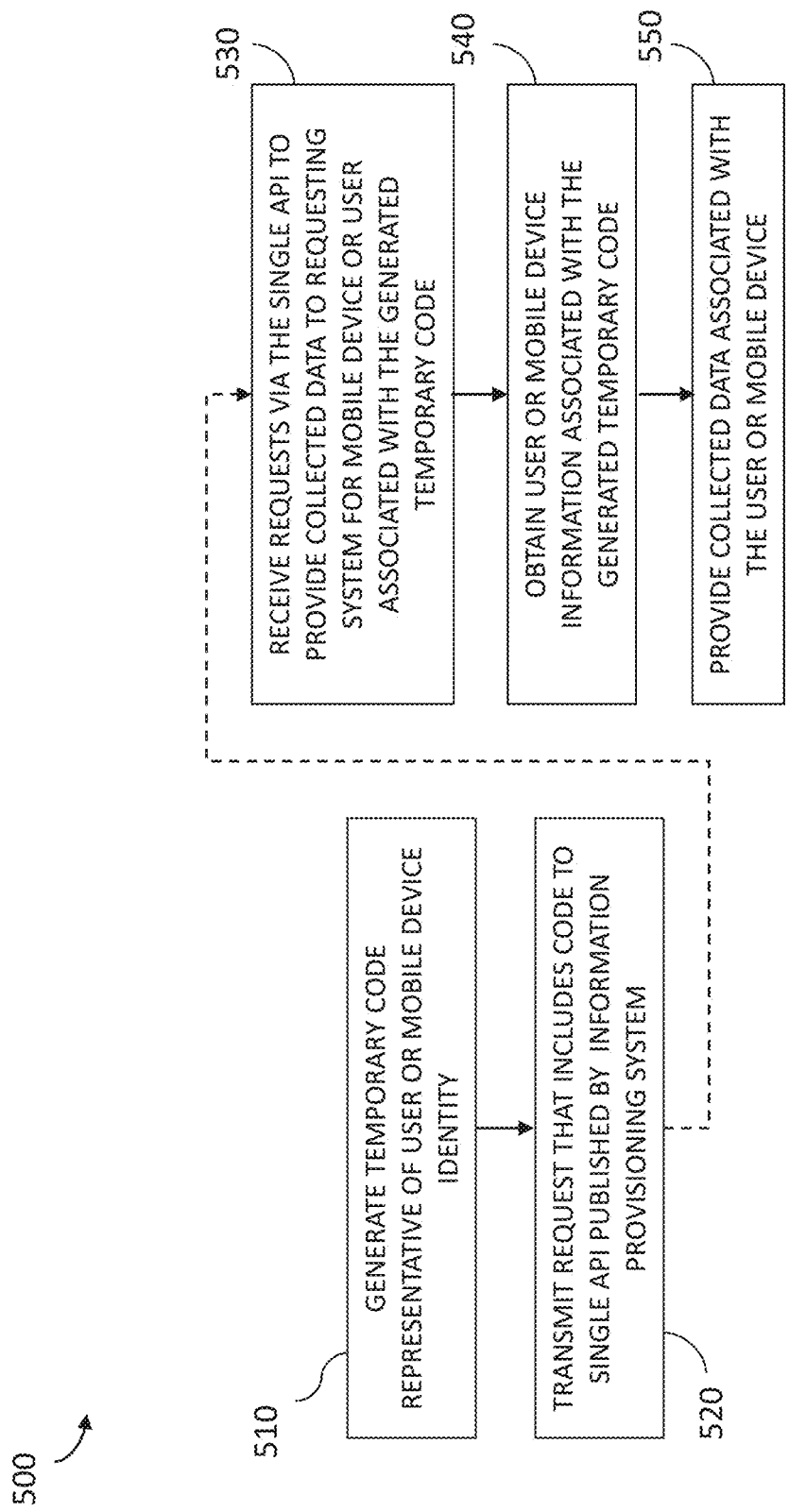
FIG. 5 is a flow diagram illustrating a method for providing data collected from multiple sources in response to receiving a temporary code representative of an identity of a mobile device or associated user.

FIG. 5 is a flow diagram illustrating a method 500 for providing data collected from multiple sources in response to receiving a temporary code representative of an identity of a mobile device or associated user. The method 500 may be performed by the information provisioning system 150, the mobile device 130, and/or the requesting system 110, and, accordingly, is described herein merely by way of reference thereto. It will be appreciated that the method 500 may be performed on any suitable hardware.

In operation 510, the mobile device 130 generates a temporary code representative of an identity of the user or mobile device. The code may be a short code that represents an identity of a subscriber of the mobile device and that is based on an international mobile station equipment identity (IMEI) of the mobile device or a mobile station international subscriber directory number (MSISDN) associated with the subscriber (e.g. where the IMEI and MSISDN are input to a hashing algorithm configured to produce just a three-character alphanumeric code).

In operation 520, the requesting system 110 transmits a request that includes the code to the single API published by the information provisioning system 150. For example, along with the request, the mobile device 130 may transmit the generated short code from the mobile device over an unstructured supplementary service data (USSD) channel to the information provisioning system 150.

In operation 530, the information provisioning system 150 receives the request via the single API, and, in operation 540, obtains user or mobile device identity information (e.g., by querying user identification database 154) associated with the code. In operation 550, the information provisioning system 150 collects different types of data, and provides the data to the requesting system 110 as described herein, which may then present the data, or a version of the data, via the GUI 115. In some cases, the user may provide the code to the requesting system 110, which then sends the request to the single API.

Figure 6:
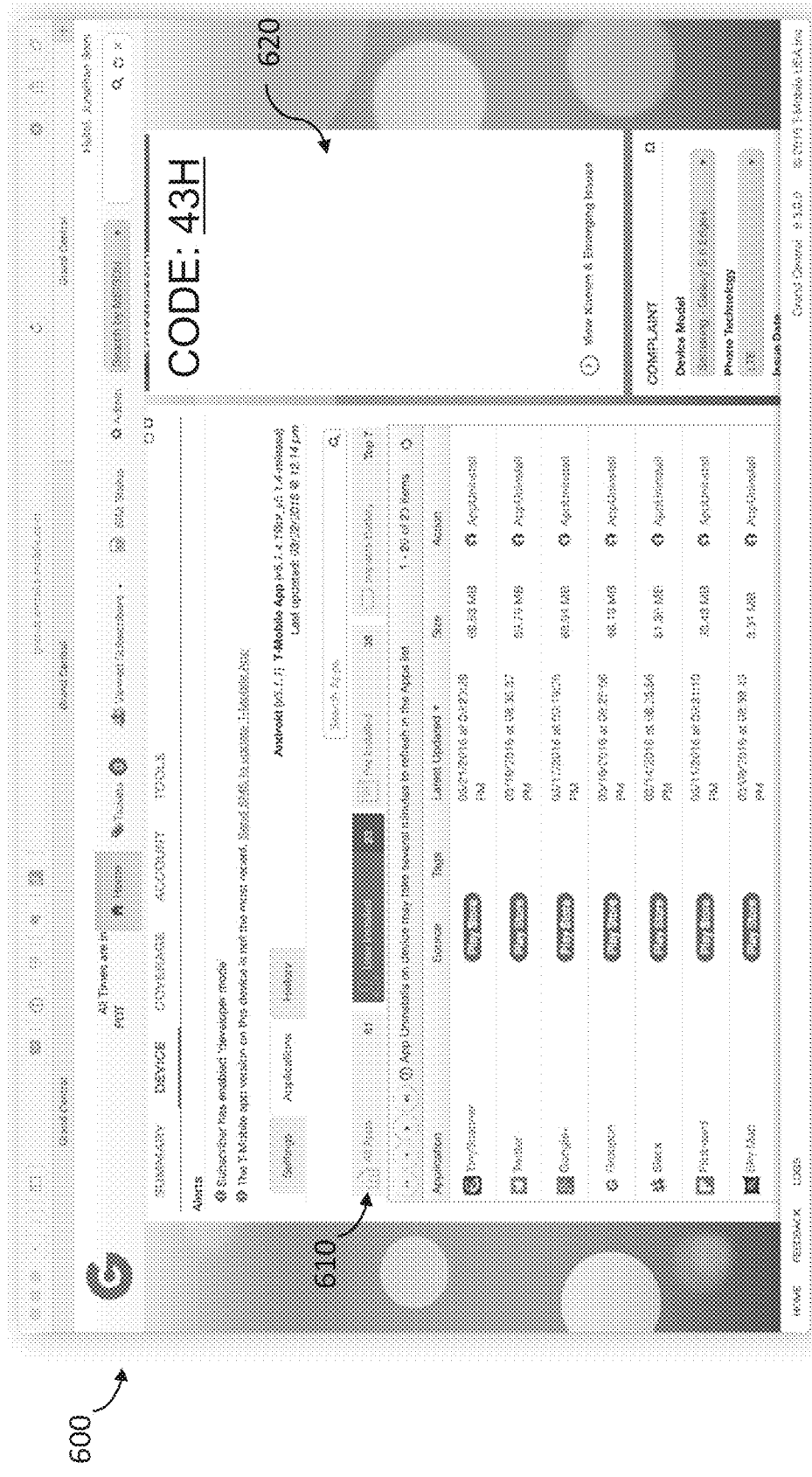
FIG. 6 is a display diagram illustrating an example user interface presenting information associated with a temporary code representative of an identity of a mobile device or associated user.

FIG. 6 is a display diagram illustrating an example user interface 600 presenting information associated with a temporary code representative of an identity of a mobile device or associated user. As depicted, the user interface 600 presents device information 610 (e.g., information associated with applications downloaded to the device), but does not display any user identity information, instead displaying the code information 620, or other obfuscated information.

The systems and methods described herein establish an abstract or intermediate layer between requesting systems and multiple, disparate data sources, by providing a single API via which calls and data requests are received, and via which data from the multiple sources is transmitted. Therefore, the systems and methods simplify the complex processes typically associated with collecting data for mobile devices and associated users, by facilitating internal systems of telecommunications carriers to direct all data request traffic to a single destination, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

We claim:

1. At least one non-transitory, computer-readable medium, carrying instructions, which when executed by at least one data processor, implements a method for use with respect to a mobile device and a wireless network, the method comprising:
    providing a single application programming interface (API) at which calls for data are received from requesting systems,
       wherein the systems are associated with a carrier for the wireless network;
    receiving, via the single API, a data request from a requesting system that includes information identifying a mobile device or subscriber of the wireless network that is associated with the mobile device;
    collecting, from multiple, disparate sources of data, in response to the data request:
       facts type data that includes information specific to use of the mobile device, the facts type data collected from a source of data internal to the wireless network, and
       capabilities type data that includes information identifying capabilities of the mobile device, the capabilities type data collected from a source of data external to the wireless network; and
    providing the facts type data and capabilities type data collected from the multiple, disparate sources of data to the requesting system via the single API.

2. The computer-readable medium of claim 1, wherein collecting data in response to the data request from multiple, disparate sources of data includes collecting the facts type data from an internal source of data, and collecting the capabilities type data from an external source of data.

3. The computer-readable medium of claim 1, wherein collecting data in response to the data request from multiple, disparate sources of data includes collecting data associated with characteristics of the mobile device, data associated with the wireless network provided, and data associated with a customer account for the subscriber of the mobile device.

4. The computer-readable medium of claim 1, wherein collecting data in response to the data request from multiple, disparate sources of data includes collecting first data from a first source of data, and collecting second data from a second source of data, wherein the second data provides context information for the first data.

5. The computer-readable medium of claim 1, wherein collecting data in response to the data request from multiple, disparate sources of data includes collecting data from a network subscriber database of the wireless network carrier and data from a device database associated with a manufacturer of the mobile device.

6. The computer-readable medium of claim 1, wherein the request includes a short alphanumeric code that represents the mobile device and obscures an identity of the subscriber associated with the mobile device.

7. The computer-readable medium of claim 1, wherein the information identifying a mobile device or subscriber of the wireless network carrier that is associated with the mobile device includes an international mobile station equipment identity (IMEI) of the mobile device.

8. The computer-readable medium of claim 1, wherein the information identifying a mobile device or subscriber of the wireless network carrier that is associated with the mobile device includes a mobile station international subscriber directory number (MSISDN) associated with the subscriber.

9. The computer-readable medium of claim 1, wherein the information identifying a mobile device or subscriber of the wireless network carrier that is associated with the mobile device includes a code that is temporarily generated to represent the mobile device and obscure an identity of the subscriber associated with the mobile device.

10. A method for use with a mobile device, wherein the mobile device is configured to access a wireless network, the method comprising:
providing a single application programming interface (API) at which calls for data are received from requesting systems,
wherein the systems are associated with a carrier for the wireless network;
receiving, via the single API, a data request from a requesting system that includes information identifying a mobile device or subscriber of the wireless network that is associated with the mobile device;
collecting, from multiple, disparate sources of data, in response to the data request:
facts type data that includes information specific to use of the mobile device, the facts type data collected from a source of data internal to the wireless network, and
capabilities type data that includes information identifying capabilities of the mobile device, the capabilities type data collected from a source of data external to the wireless network; and
providing the facts type data and capabilities type data collected from the multiple, disparate sources of data to the requesting system via the single API.

11. The method of claim 10, wherein collecting data in response to the data request from multiple, disparate sources of data includes collecting the facts type data from an internal source of data, and collecting the capabilities type data from an external source of data.

12. The method of claim 10, wherein collecting data in response to the data request from multiple, disparate sources of data includes collecting data associated with characteristics of the mobile device, data associated with the wireless network provided, and data associated with a customer account for the subscriber of the mobile device.

13. The method of claim 10, wherein collecting data in response to the data request from multiple, disparate sources of data includes collecting first data from a first source of data, and collecting second data from a second source of data, wherein the second data provides context information for the first data.

14. The method of claim 10, wherein collecting data in response to the data request from multiple, disparate sources of data includes collecting data from a network subscriber database of the carrier and data from a device database associated with a manufacturer of the mobile device.

15. The method of claim 10, wherein the request includes a short alphanumeric code that represents the mobile device and obscures an identity of the subscriber associated with the mobile device.

16. The method of claim 10, wherein the information identifying a mobile device or subscriber of the wireless network carrier that is associated with the mobile device includes an international mobile station equipment identity (IMEI) of the mobile device.

17. The method of claim 10, wherein the information identifying a mobile device or subscriber of the wireless network carrier that is associated with the mobile device includes a mobile station international subscriber directory number (MSISDN) associated with the subscriber.

18. The method of claim 10, wherein the information identifying a mobile device or subscriber of the wireless network carrier that is associated with the mobile device includes a code that is temporarily generated to represent the mobile device and obscure an identity of the subscriber associated with the mobile device.

19. At least one non-transitory computer-readable medium whose contents, when executed by a computing system, cause the computing system to perform a method, the method comprising:
providing, to requesting systems, multiple, different types of information for mobile devices,
wherein the requesting systems include at least one customer service system of a carrier associated with a telecommunications network,
wherein a single application programming interface (API), when called by a requesting system, provides the multiple, different types of information back to the requesting system via the single API,
wherein a request for information from the requesting system includes information identifying a mobile device or subscriber of the telecommunications network carrier associated with the mobile device,
wherein the API facilitates collecting information in response to the information request from the multiple, disparate sources of data, the collected information including:
facts type data that includes information specific to use of the mobile device, the facts type data collected from a source of data internal to the wireless network, and
capabilities type data that includes information identifying capabilities of the mobile device, the capabilities type data collected from a source of data external to the wireless network, and
wherein the single API provides a layer of abstraction between the requesting system and the multiple, disparate sources of data, thereby enabling the requesting system to provide the information identifying the mobile device or subscriber to obtain information from data sources internal and external to the telecommunications network carrier.

20. The non-transitory computer-readable medium of claim 19, wherein the request for information includes a short alphanumeric code that represents the mobile device and obscures an identity of the subscriber associated with the mobile device.

* * * * *